US011521780B2

(12) United States Patent
Roberts et al.

(10) Patent No.: US 11,521,780 B2
(45) Date of Patent: Dec. 6, 2022

(54) STATIC HEAT EXCHANGER FOR WIRELESS POWER TRANSFER PAD

(71) Applicant: Utah State University, Logan, UT (US)

(72) Inventors: Nicholas A. Roberts, Logan, UT (US); James Mullen, Logan, UT (US); Regan A. Zane, Hyde Park, UT (US); Abhilash Kamineni, North Logan, UT (US); Benny J. Varghese, Logan, UT (US); Marvin Hailing, Hyde Park, UT (US)

( * ) Notice: Subject to any disclaimer, the term of this patent is extended or adjusted under 35 U.S.C. 154(b) by 336 days.

(21) Appl. No.: 17/023,865

(22) Filed: Sep. 17, 2020

(65) Prior Publication Data

US 2021/0082613 A1 Mar. 18, 2021

Related U.S. Application Data

(60) Provisional application No. 62/901,714, filed on Sep. 17, 2019.

(51) Int. Cl.
| | |
|---|---|
| *H01F 27/18* | (2006.01) |
| *H02J 7/00* | (2006.01) |
| *H02J 50/10* | (2016.01) |
| *H01F 27/02* | (2006.01) |

(52) U.S. Cl.
CPC ........... *H01F 27/18* (2013.01); *H01F 27/025* (2013.01); *H02J 7/0042* (2013.01); *H02J 50/10* (2016.02)

(58) Field of Classification Search
CPC ........ H01F 27/18; H01F 27/025; H01F 27/08; H01F 27/366; H01F 38/14; H02J 7/0042; H02J 50/10; H02J 50/005
See application file for complete search history.

(56) References Cited

U.S. PATENT DOCUMENTS

2017/0129344 A1\* 5/2017 Islinger ................... B60L 53/12

FOREIGN PATENT DOCUMENTS

KR 20160028365 A \* 3/2016 ........... H04B 5/0037

OTHER PUBLICATIONS

Keyser, Battery Thermal Modeling and Testing, 2011 D.O.E. Hydrogen Program and Vehicle Technologies Program Annual Merit Review & Peer Evaluation Meeting, May 9-13, 2011, Arlington, VA, USA.

(Continued)

*Primary Examiner* — Emmanuel E Duke

(57) ABSTRACT

An apparatus for a wireless power transfer ("WPT") pad heat management system includes a ferrite structure positioned adjacent to a coil configured to wirelessly transfer power. The apparatus includes a plurality of heat spreaders positioned along a length of a component of the ferrite structure. Each of the plurality of heat spreaders is non-metallic. The apparatus includes a trough shaped to surround at least a portion of each of the plurality of heat spreaders, wherein the trough is non-metallic. The apparatus includes a phase change material ("PCM") in the trough where at least a portion of the heat spreaders extend into the PCM. The ferrite structure, coil, plurality of heat spreaders, trough and PCM are encased in a solid material, and each of the plurality of heat spreaders comprises a material that transfers heat from the component of the ferrite structure to the PCM.

20 Claims, 8 Drawing Sheets

(56) References Cited

OTHER PUBLICATIONS

Keyser et al., Enabling fast charging-Battery thermal considerations, Journal of Power Sources, Oct. 23, 2017, pp. 228-236, vol. 367.
Liu et al., Experimental Investigation on Cooling/Heating Characteristics of Ultra-Thin Micro Heat Pipe for Electric Vehicle Battery Thermal Management, Chin. J. Mech. Eng, Jun. 26, 2018.
Roberts, Thermal Management of Roadway Embedded Wireless Power Transfer Modules, 4th SELECT Annual Meeting and Technology Showcase, Sep. 17-18, 2019, Logan, UT.

* cited by examiner

Table II PCM Candidates

| PCM | Melting Temp (C) | Latent Heat of Fusion (kJ/kg) | Specific Heat (C) | Density (g/cm³) | Thermal Conductivity (W/mK) | Viscosity (mm³/s at 70C) | Flash Point |
|---|---|---|---|---|---|---|---|
| 1,2,4,5-tetramethylbenzene | 77-174.74 | 156 | | 0.838 | | | |
| PureTemp® 108 | 108 | | | 0.87 | | | |
| PureTemp® 68 | 68 | 198 | 1.85 | 0.87 | | 12 | |
| PlusICE™ Organic A82 | 82 | 170 | 2.21 | 0.85 | 0.22 | | 250[1] |
| RubiTherm® RT82 | 77-82 | 170 | 2 | 0.88 | 0.2 | | >200 |
| RubiTherm® RT80HC | 77-80 | 220 | 2 | 0.9 | 0.14 | | 110[1] |

[1] Maximum Operating Temperature

FIG. 11

STATIC HEAT EXCHANGER FOR WIRELESS POWER TRANSFER PAD

CROSS-REFERENCES TO RELATED APPLICATIONS

This application claims the benefit of U.S. Provisional Patent Application No. 62/901,714 entitled "Submerged Phase-Change Thermal Management of Wireless Power Transfer Coils" and filed on Sep. 17, 2019 for Nicholas A. Roberts, which is incorporated herein by reference.

FIELD

This invention relates to wireless power transfer pads and more particularly relates to heat management within a wireless power transfer pad.

BACKGROUND

Wireless power transfer is a way to transfer power from a transmitter, which may be called a primary pad, to a receiver. The receiver may be a vehicle that is moving or stationary. For wireless power transfer to a vehicle, often a large amount of power is transmitted to minimize charging time. Some heat is typically lost during the wireless power transfer and typically is manifest as core loss in a ferrite structure of the primary pad. Transmitting a large amount of power during wireless power transfer requires heat dissipation in the primary pad, which is challenging.

SUMMARY

An apparatus for a wireless power transfer ("WPT") pad heat management system is disclosed. Another apparatus and a system also perform the functions of the apparatus. The apparatus includes a ferrite structure positioned adjacent to a coil configured to wirelessly transfer power. The apparatus includes a plurality of heat spreaders positioned along a length of a component of the ferrite structure. Each of the plurality of heat spreaders is non-metallic. The apparatus includes a trough shaped to surround at least a portion of each of the plurality of heat spreaders, wherein the trough is non-metallic. The apparatus includes a phase change material ("PCM") in the trough where at least a portion of the heat spreaders extend into the PCM. The ferrite structure, coil, plurality of heat spreaders, trough and PCM are encased in a solid material, and each of the plurality of heat spreaders comprises a material that transfers heat from the component of the ferrite structure to the PCM.

Another apparatus for a WPT pad heat management system includes a ferrite structure positioned adjacent to a coil configured to wirelessly transfer power to a receiver. The ferrite structure includes a plurality of components separated from each other where each component has a top surface positioned adjacent to the coil. Each component includes a plurality of heat spreaders positioned along a length of the component, where each of the plurality of heat spreaders is non-metallic and extends away from a bottom of the component distal to the top surface and away from sides of the component. Each component includes a trough shaped to surround each of the plurality of heat spreaders, where the trough is non-metallic, and a PCM positioned in the trough. Each of the plurality of heat spreaders extend into the PCM. The ferrite structure, coil, plurality of heat spreaders, trough and PCM are encased in concrete, and each of the plurality of heat spreaders includes a material that transfers heat from the component of the ferrite structure to the PCM. The PCM includes a phase change temperature between a solid state and a liquid state of the PCM that is within an optimal temperature range of the component of the ferrite structure. The optimal temperature range includes a temperature range where core loss of the component of the ferrite structure is minimized.

A system for a WPT pad heat management includes a block of solid material, a coil configured to wirelessly transmit power to a receiver, a converter connected to the coil where the converter transmits power to the coil, and a ferrite structure positioned adjacent to the coil. The ferrite structure includes a plurality of components. Each component includes a plurality of heat spreaders positioned along a length of a component of the ferrite structure, where each of the plurality of heat spreaders is non-metallic, a trough shaped to surround at least a portion of each of the plurality of heat spreaders, where the trough is non-metallic, and a PCM in the trough, where at least a portion of the heat spreaders extend into the PCM. Each of the plurality of heat spreaders includes a material that transfers heat from the component to the PCM. The ferrite structure, coil, plurality of heat spreaders, trough and PCM are encased in the block of solid material.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 11 depicts Table II with PCM candidates.

DETAILED DESCRIPTION

Figure 1:
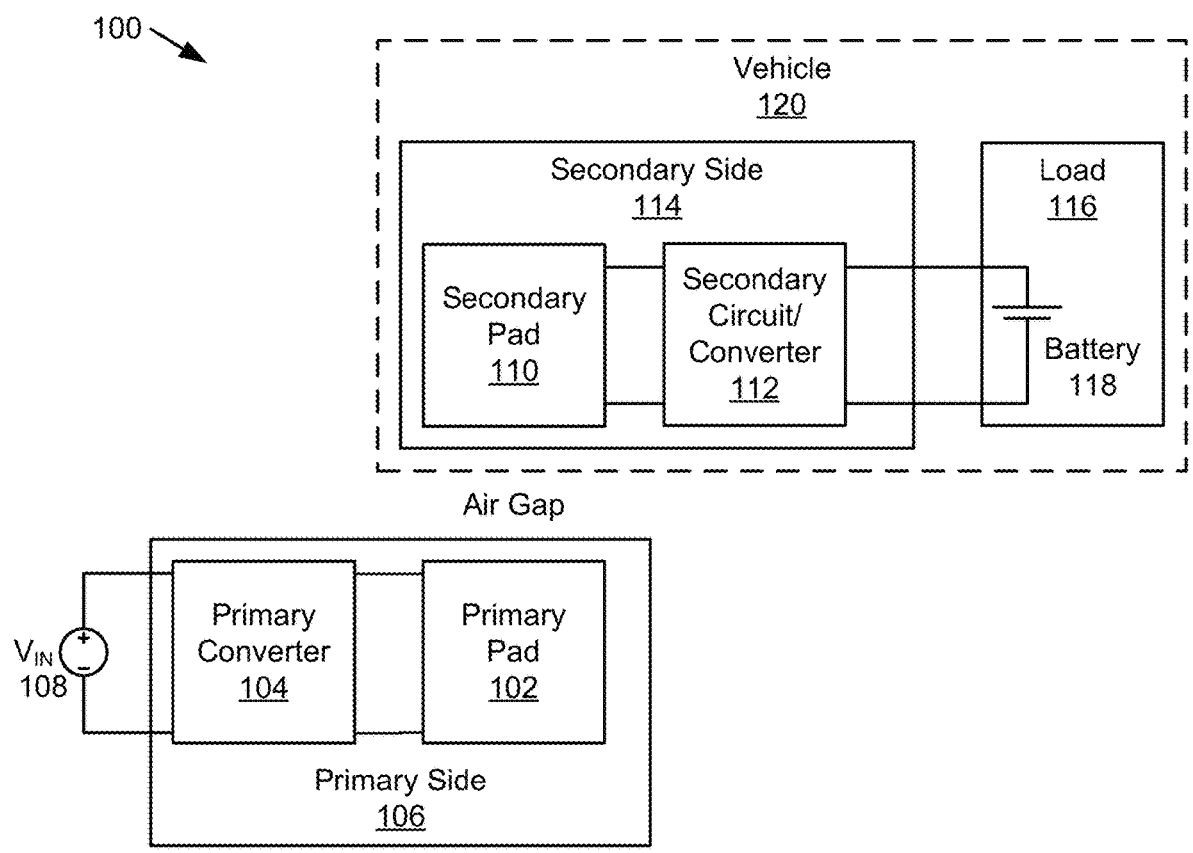
FIG. 1 a schematic block diagram illustrating one embodiment of a system for wireless power transfer.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of user selections, to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for a wireless power transfer ("WPT") pad heat management system is disclosed. Another apparatus and a system also perform the functions of the apparatus. The apparatus includes a ferrite structure positioned adjacent to a coil configured to wirelessly transfer power. The apparatus includes a plurality of heat spreaders positioned along a length of a component of the ferrite structure. Each of the plurality of heat spreaders is non-metallic. The apparatus includes a trough shaped to surround at least a portion of each of the plurality of heat spreaders, wherein the trough is non-metallic. The apparatus includes a phase change material ("PCM") in the trough where at least a portion of the heat spreaders extend into the PCM. The ferrite structure, coil, plurality of heat spreaders, trough and PCM are encased in a solid material, and each of the plurality of heat spreaders comprises a material that transfers heat from the component of the ferrite structure to the PCM.

In some embodiments, the PCM includes a phase change temperature between a solid state and a liquid state of the PCM that is within an optimal temperature range of the ferrite structure. The optimal temperature range includes a temperature range where core loss of the ferrite structure is minimized. In other embodiments, the temperature range is where a core loss of the ferrite structure is below a core loss threshold for a particular magnetic flux density. In other embodiments, the component of the ferrite structure is a ferrite bar and the ferrite structure includes a plurality of ferrite bars.

In some embodiments, a top surface of the component of the ferrite structure is adjacent to a portion of the coil and each of the plurality of heat spreaders is shaped to contact at least a bottom of the component distal to the top surface. In further embodiments, each of the plurality of heat spreaders is further shaped to contact two sides of the component. In other embodiments, each of the plurality of heat spreaders includes a planar shape and is positioned to extend away from the component into the PCM. In other embodiments, the plurality of heat spreaders are each positioned a uniform distance apart along a length of the trough. In other embodiments, the trough includes a depth to surround the heat spreaders and component of the ferrite structure.

In some embodiments, the apparatus includes a heat spreader anchor that contacts each of the plurality of heat spreaders and maintains a position of each of the plurality of heat spreaders with respect to each other. The heat spreader anchor, in some embodiments, is non-metallic. In other embodiments, the heat spreader anchor includes a linear element positioned at a bottom of the trough. In other embodiments, the linear element includes a slot for each of the plurality of heat spreaders, where each heat spreader of the plurality of heat spreaders engages a slot of the linear element such that the heat spreader is in a fixed position. In other embodiments, the heat spreader anchor includes a plurality of grooves on an interior surface of the trough, where each groove is shaped to retain a heat spreader of the plurality of heat spreaders in a fixed position. In other embodiments, the solid material is concrete. In other embodiments, each of the plurality of heat spreaders is a thermally conductive electrically insulating plastic, a ceramic, a polylactic acid, an acrylonitrile butadiene styrene ("ABS") plastic, alumina, carbon, or a high-fill epoxy.

Another apparatus for a WPT pad heat management system includes a ferrite structure positioned adjacent to a coil configured to wirelessly transfer power to a receiver. The ferrite structure includes a plurality of components separated from each other where each component has a top surface positioned adjacent to the coil. Each component includes a plurality of heat spreaders positioned along a length of the component, where each of the plurality of heat spreaders is non-metallic and extends away from a bottom of the component distal to the top surface and away from sides of the component. Each component includes a trough shaped to surround each of the plurality of heat spreaders, where the trough is non-metallic, and a PCM positioned in the trough, where each of the plurality of heat spreaders extend into the PCM. The ferrite structure, coil, plurality of heat spreaders, trough and PCM are encased in concrete, and each of the plurality of heat spreaders includes a material that transfers heat from the component of the ferrite structure to the PCM. The PCM includes a phase change temperature between a solid state and a liquid state of the PCM that is within an optimal temperature range of the component of the ferrite structure. The optimal temperature range includes a temperature range where core loss of the component of the ferrite structure is minimized.

In some embodiments, each component of the ferrite structure includes a ferrite bar and the ferrite structure is a plurality of ferrite bars spaced apart from each other. In other embodiments, the apparatus includes a heat spreader anchor for each component of the plurality of components. The heat spreader anchor of a component of the plurality of components contacts each of the plurality of heat spreaders of the component and maintains a position of each of the plurality of heat spreaders with respect to each other. The heat spreader anchor, in some embodiments, is non-metallic. In other embodiments, the trough includes a depth to surround the heat spreaders and component of the ferrite structure. In other embodiments, the plurality of heat spreaders of a component of the plurality of components of the ferrite structure are each positioned a uniform distance apart along a length of the trough.

A system for a WPT pad heat management includes a block of solid material, a coil configured to wirelessly transmit power to a receiver, a converter connected to the coil, the converter transmitting power to the coil, and a ferrite structure positioned adjacent to the coil. The ferrite structure includes a plurality of components. Each component includes a plurality of heat spreaders positioned along a length of a component of the ferrite structure, where each of the plurality of heat spreaders is non-metallic, a trough shaped to surround at least a portion of each of the plurality of heat spreaders, where the trough is non-metallic, and a PCM in the trough, where at least a portion of the heat spreaders extend into the PCM. Each of the plurality of heat spreaders includes a material that transfers heat from the component to the PCM, and the ferrite structure, coil, plurality of heat spreaders, trough and PCM are encased in the block of solid material.

FIG. 1 a schematic block diagram illustrating one embodiment of a system 100 for wireless power transfer ("WPT"). The system 100 includes a primary pad 102 that is typically in a fixed location and is typically encased in a solid material, such as concrete, fiberglass, resin, etc. A primary converter 104 receives power from a voltage source Vin 108. The voltage source yin may be a utility power source, a generator, a battery, a solar panel system, etc. or any combination thereof. In other embodiments, the primary converter 104 receives power from a current source, such as an alternating current ("AC") to direct current ("DC") converter. The primary pad 102 and primary converter 104 are part of a primary side 106 that provides power in a wireless power transfer process to a receiver. The receiver includes a secondary pad 110 feeding a secondary circuit/converter 112 on a secondary side 114. The secondary circuit/converter 112 feeds a load 116, which may include a battery 118, a motor, or other type of load. In some embodiments, the secondary side 114 and load 116 are in a vehicle 120.

Typically, the primary pad 102 is embedded in a solid material for durability. For example, the primary pad 102 may be in a roadway, in a parking lot, or other location and often must withstand forces caused by a vehicle 120 rolling over the primary pad 102. In some embodiments, the primary converter 104 or some of the components of the primary converter 104 are also embedded in the solid material.

Typically, the primary converter 104 provides AC power to the primary pad 102. The primary pad 102 typically includes a ferrite core under coils where the ferrite core and coils are designed to transmit power wirelessly in a direction where the secondary pad 110 is positioned or passes. The primary pad 102 is designed to receive the AC power from the primary converter 104 so that the primary pad 102 transmits power wirelessly to the receiver across a gap. The gap is typically at least partially an air gap. The gap may include a portion of the solid material, a portion of material surrounding the secondary pad 110, etc. The gap may also be across other materials, such as water.

The primary pad 102 is not perfect and some core loss is often present due to eddy currents in the ferrite structure and other materials of the solid material and primary pad 102. For example, where the solid material is concrete, the concrete may include rebar and the magnetic field generated by the coil of the primary pad 102 may induce eddy currents in the rebar, which creates core loss. Some pad designs do not include metallic rebar, but core losses are present in the ferrite structure.

A problem arises when the primary pad 102 is embedded in a solid material when heat generated by the core losses in the ferrite structure is not transferred to materials, such as soil, asphalt, etc., or air surrounding the solid material as fast as heat is generated by the core loss. In addition, hot spots around elements of the ferrite structure may cause damage to the ferrite structure and/or coil. The hot spots may also create a hazard where the hot spots reach a surface of the solid material that is exposed to people, animals, flammable brush, etc. As power levels increase in WPT systems 100, heating problems are compounded.

Figure 2:
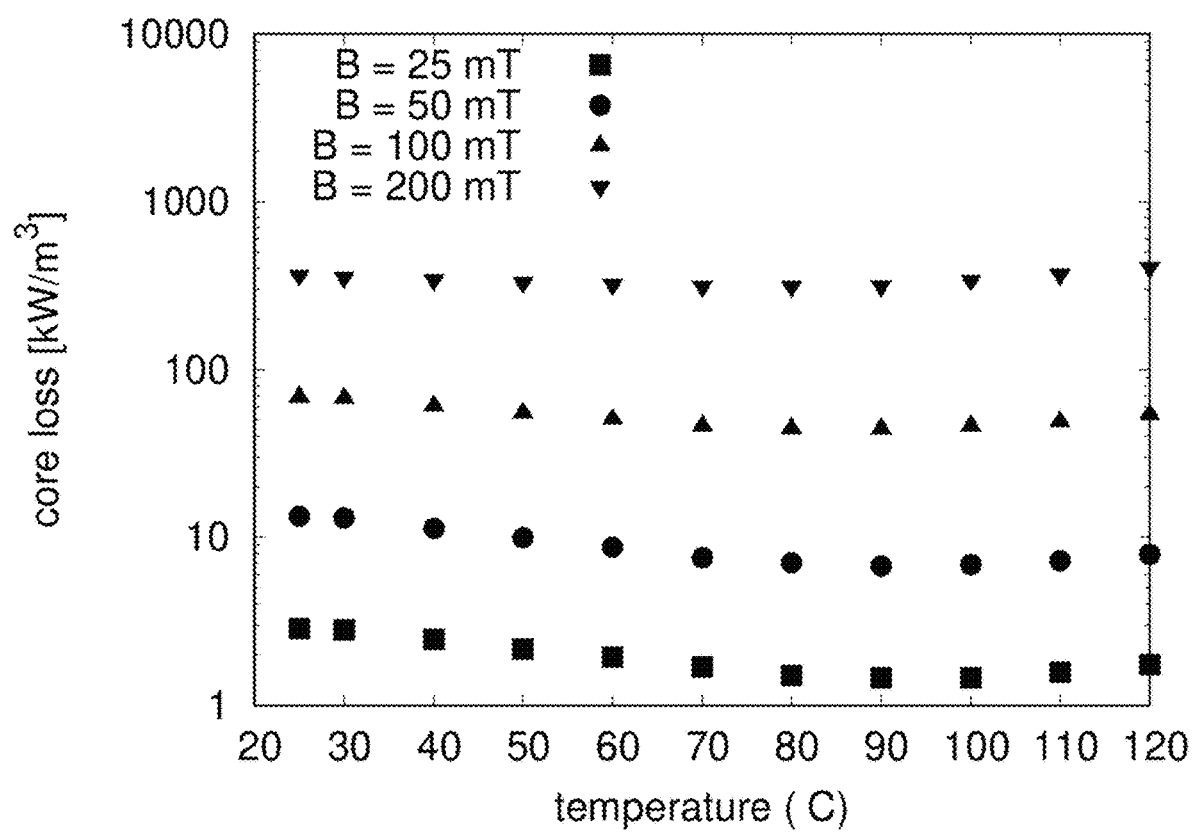
FIG. 2 is chart depicting core loss as a function of temperature for various magnetic field strengths in a pad for wireless power transfer.

FIG. 2 is chart depicting core loss as a function of temperature for various magnetic field strengths in a pad for wireless power transfer. The chart depicts four different magnetic field strengths at 25 milli-Teslas ("mT"), 50 mT, 100 mT and 200 mT. For each magnetic field strength, core loss in terms of kilowatt ("kW") per cubic meter ("$m^3$") for various temperatures are depicted. Note that for each magnetic field strength level, core loss decreases and then increases over the depicted temperature range. Minimizing core loss is desirable and the chart of FIG. 2 indicates that merely reducing temperature of a WPT pad does not result in minimal core loss. Thus, it is desirable to maintain the pad within a range where the core loss is minimized at a particular temperature at or near a minimum core loss value.

Note that a minimum for each magnetic field strength does not occur at a same temperature. Thus, design of a heat management system, in some embodiments, includes selecting a magnetic field strength as a design point and then determining an optimal temperature or an optimal temperature range to minimize core loss. The chart of FIG. 2 has a logarithmic scale for core loss and a linear scale typically depicts a dip in core loss more clearly. Maintaining temperature of a WPT pad at a particular temperature or within a particular temperature range is difficult due to uneven temperature distribution within the WPT pad.

Figure 3:
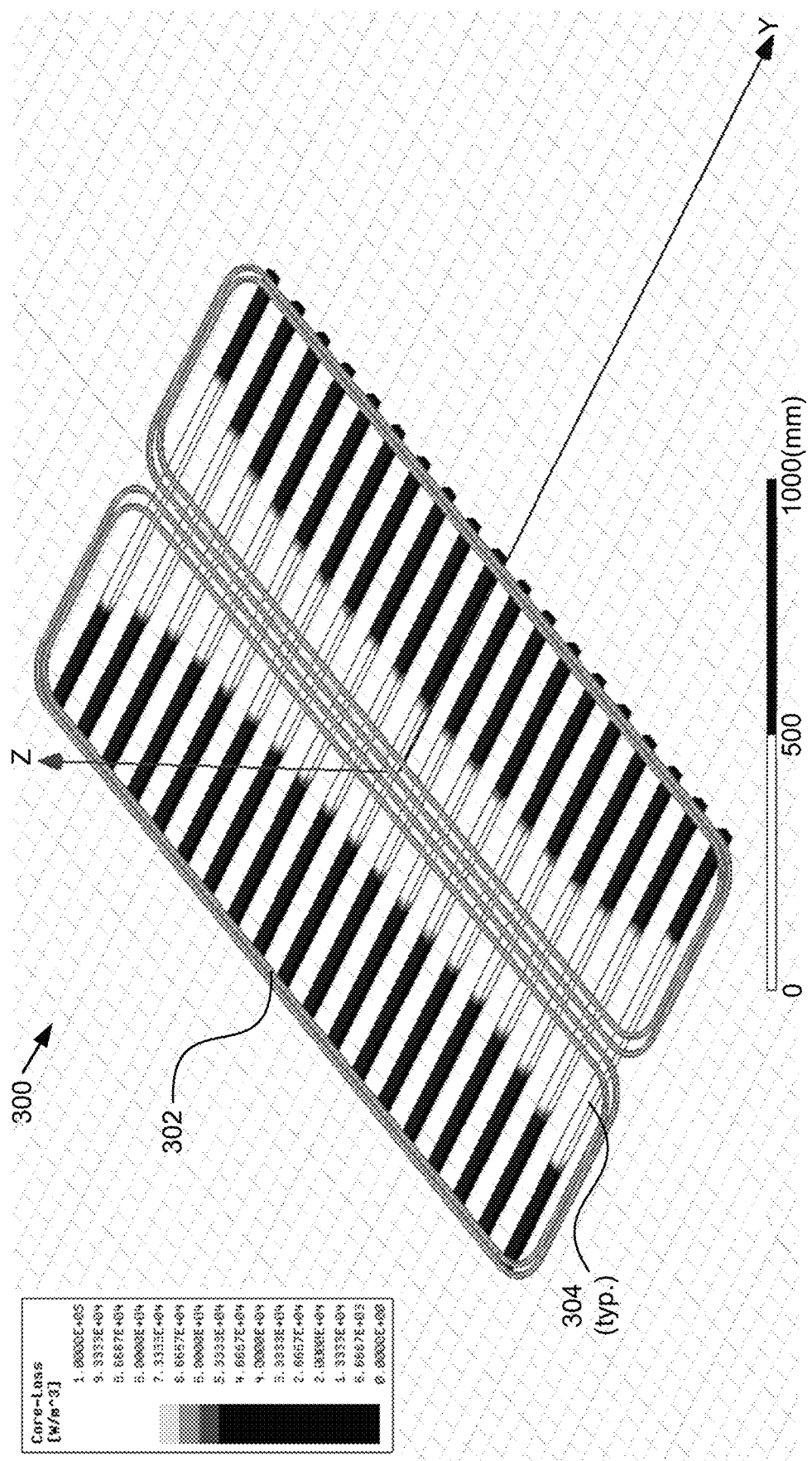
FIG. 3 is a simulation of core loss in a coil of a wireless power transfer ("WPT") pad and ferrite bars under the coil.

FIG. 3 is a simulation of core loss in a coil 302 of a WPT pad 300 and ferrite bars 304 under the coil 302. The ferrite bars 304 are components of a ferrite structure for the WPT pad 300. The simulation indicates that the core loss is highest near a center of the WPT pad 300 where portions of the coils 302 are grouped. A heat management system, in some embodiments, may cause a more even distribution of core loss and maintains a temperature of the ferrite bars 304 at a desired value or within a desired range.

Figure 4:
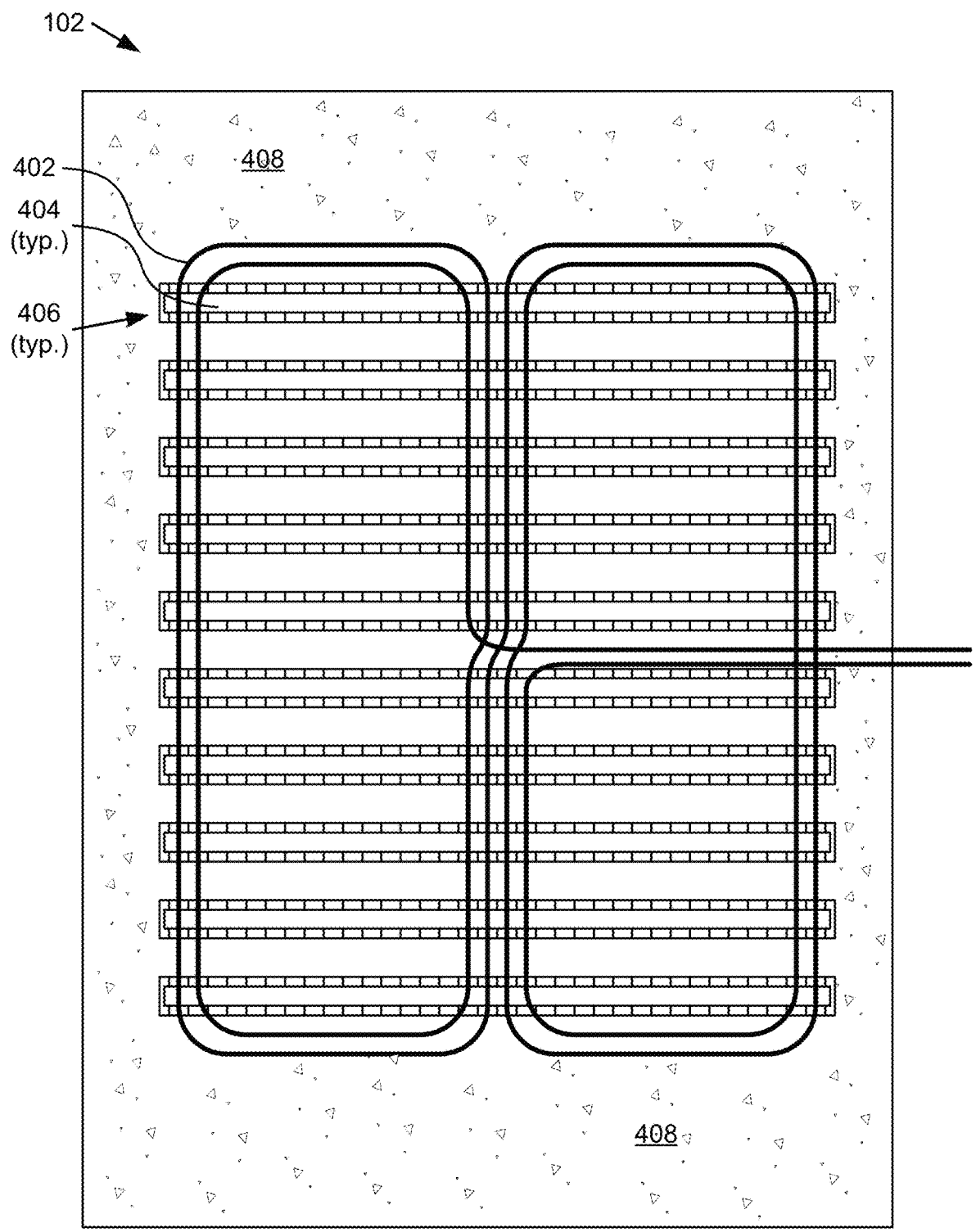
FIG. 4 is a top view of a WPT pad with a coil and ferrite bars and elements of a WPT pad heat management system.

FIG. 4 is a top view of a WPT pad 102 with a coil 402 and ferrite bars 404 and elements 406 of a WPT pad heat management system. The primary pad 102 of FIG. 1 and the WPT pad 102 of FIG. 4 are substantially similar and the term WPT pad is used in FIG. 3 to denote a generic pad for wireless power transfer. The ferrite bars 404 are components of a ferrite structure of the primary pad 102. The elements 406 of the heat management system ("heat management elements") surround the ferrite bars 404, as described below. Typically, components of a ferrite structure are positioned adjacent to a coil 402 configured to wirelessly transfer power. The ferrite bars 404 are one embodiment of components of a ferrite structure. The components of the ferrite structure being adjacent to a coil 402 may be directly against the coil 402 or a small distance away from the coils 402. The components of the ferrite structure being adjacent to the coil 402 are sufficiently close to induce a magnetic field in the ferrite structure to enable wireless power transfer to a receiver.

The coil 402, ferrite bars 404 and heat management elements 406 are embedded in a solid material 408. The solid material 408 may be concrete, fiberglass, a resin, a carbon composite, or other material. The solid material 408 is often not a good conductor of heat and often acts as an insulator, which inhibits heat transfer. While a particular pad design, coil design and ferrite design are depicted in FIG. 4, one of skill in the art will recognize that embodiments described herein are applicable to other pad designs, coil designs and ferrite structure designs.

Figure 5:
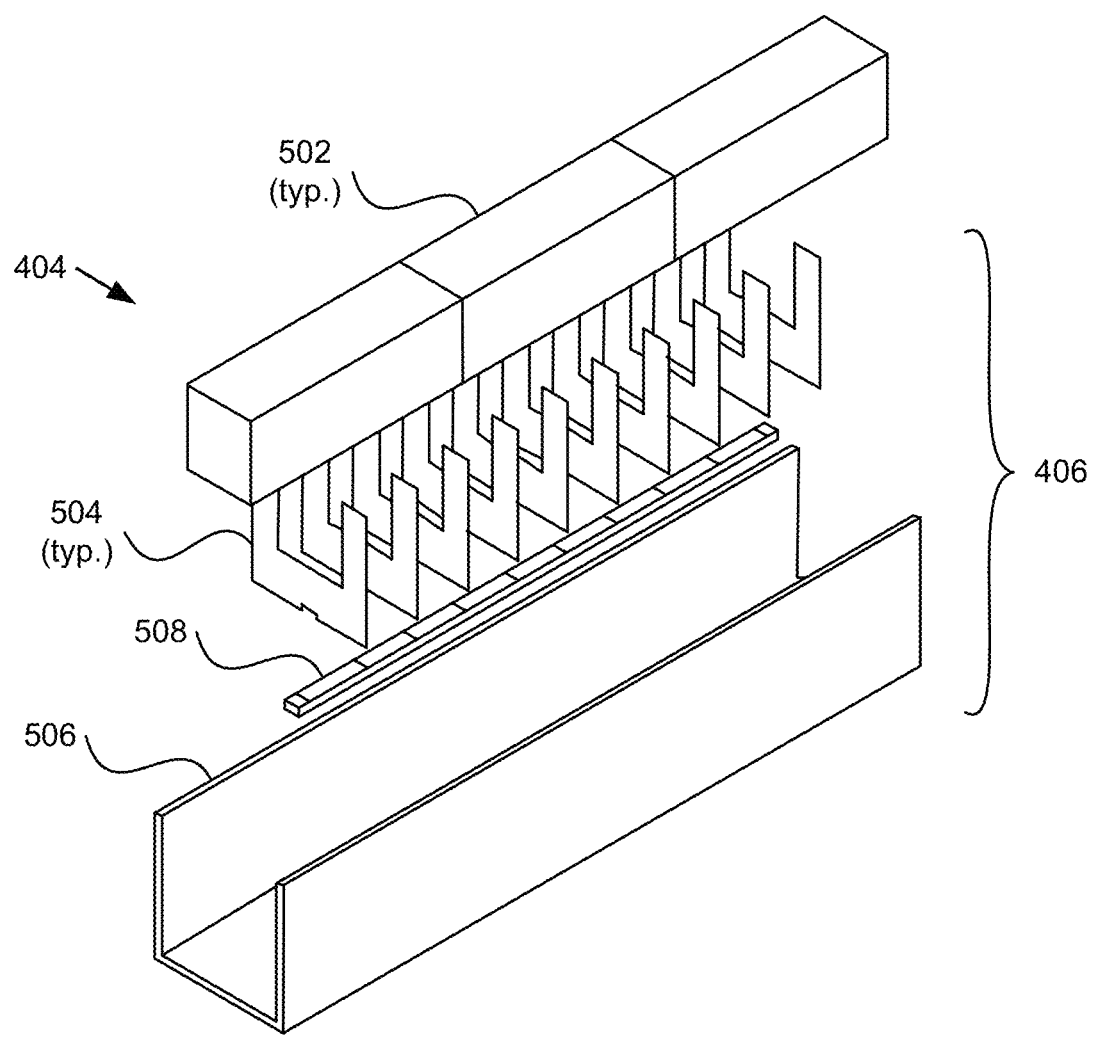
FIG. 5 is a perspective view of a portion of a ferrite bar along with elements of the WPT pad heat management system of FIG. 4.

FIG. 5 is a perspective view of a portion of a ferrite bar 404 along with elements 406 of the WPT pad heat management system of FIG. 4. The ferrite bar 404 is depicted as ferrite bar segments 502 grouped together in a row. Heat management elements 406 of a heat management system are applicable to other designs of a primary pad 102 with different configurations of one or more coils and/or one or more components of a ferrite structure. The heat management elements 406 include heat spreaders 504, a trough 506 and a heat spreader anchor 508. A phase change material ("PCM") (not shown) is located in the trough 506 around the heat spreaders 504 and ferrite bar 404.

The heat spreaders 504 are positioned along a length of a ferrite bar 404 of the ferrite structure. In other primary pad designs, the heat spreaders 504 are positioned in other configurations with spacing appropriate for a configuration of components of the ferrite structure. In some embodiments, the heat spreaders 504 are made of a non-metallic material to avoid inducing eddy currents and core loss. The heat spreaders 504 are shaped to contact at least a portion of a component of a ferrite structure. As used herein the heat spreaders 504 contacting a component of a ferrite structure includes partial contact, full contact or other amount of contact sufficient for heat from the components of the ferrite structure to transfer heat to the heat spreaders 504.

In FIG. 5, the heat spreaders 504 are shaped to contact the ferrite bar 404. In the embodiment, shown, the heat spreaders 504 are shaped to contact three sides of the ferrite bar 404 while the heat spreaders 504 stop short of a top side adjacent to the coil 402 to allow the coil 402 to be positioned adjacent to the ferrite bar 404. In other designs, at least some of the heat spreaders 504 extend to the top side of the ferrite bar 404. In the depicted embodiment of FIG. 4, the heat spreaders 504 are "U"-shaped and are shaped to fit within dimensions of the trough 506.

The trough 506 is shaped to surround at least a portion of each of the plurality of heat spreaders 504. In some embodiments, the trough 506 extends up sides of the component of the ferrite structure positioned in the trough 506 to a plane aligned with the top side of the ferrite structure. For example, the trough 506 may extend to a top side of the ferrite bar 404. In other embodiments, the trough 506 extends only part way up the sides of the component of the ferrite structure. For example, the trough 506 may extend part way up sides of the ferrite bar 404. In other embodiments, the trough 506 is shaped to contain the component of the ferrite structure. Where the components of the ferrite structure are shaped differently, the shape of the trough 506 is modified to accommodate the particular shape of the components of the ferrite structure. Where the component is a ferrite bar 404, the trough 506 has a length equal to or greater than a ferrite bar 404 so the ferrite bar 404 fits in the trough 506. Typically, the trough 506 is non-metallic to avoid eddy currents and core loss. Typically, the trough 506 includes end caps (not shown) so that the PCM in liquid form does not run out of the trough 506.

The heat management elements 406, in some embodiments, include one or more heat spreader anchors 508. The heat spreader anchors 508 contact each of the plurality of heat spreaders 504 and maintain a position of each of the plurality of heat spreaders 504 with respect to each other to prevent movement of the heat spreaders 504 during assembly and use. In some embodiments, the heat spreader anchor 508 includes a linear element positioned at a bottom of the trough 506 where the linear element includes a slot for each of the plurality of heat spreaders 504. Each heat spreader 504 of the plurality of heat spreaders 504 engages a slot of the linear element such that the heat spreader 504 is in a fixed position. The heat spreader anchor 508 of FIG. 5 is a linear element with slots for each of the heat spreaders 504. In some embodiments, the heat spreaders 504 each include a notch so that when a heat spreader 504 is placed in the heat spreader anchor 508, a bottom edge of the heat spreaders 504 contacts or is in close proximity to a bottom of the trough 506. In other embodiments, the heat spreaders 504 do not include a notch. Typically, the heat spreader anchors 508 are non-metallic to avoid eddy currents and core loss.

Figure 6:
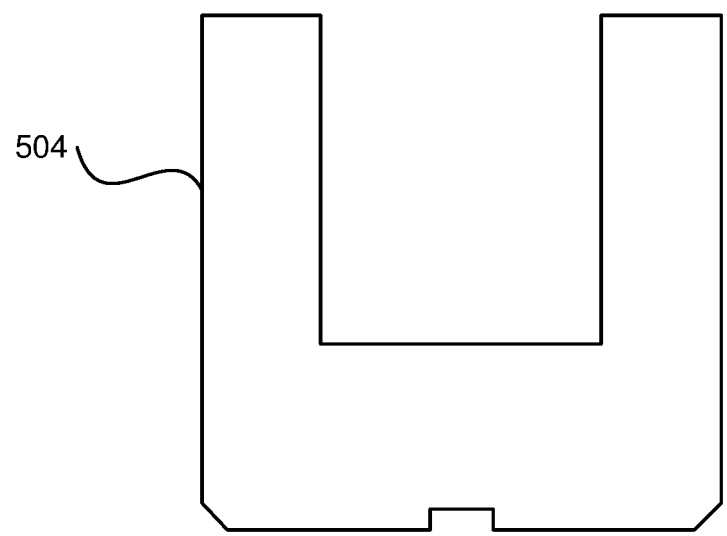
FIG. 6 is a side view of a heat spreader of the WPT pad heat management system of FIG. 4.
Figure 7:
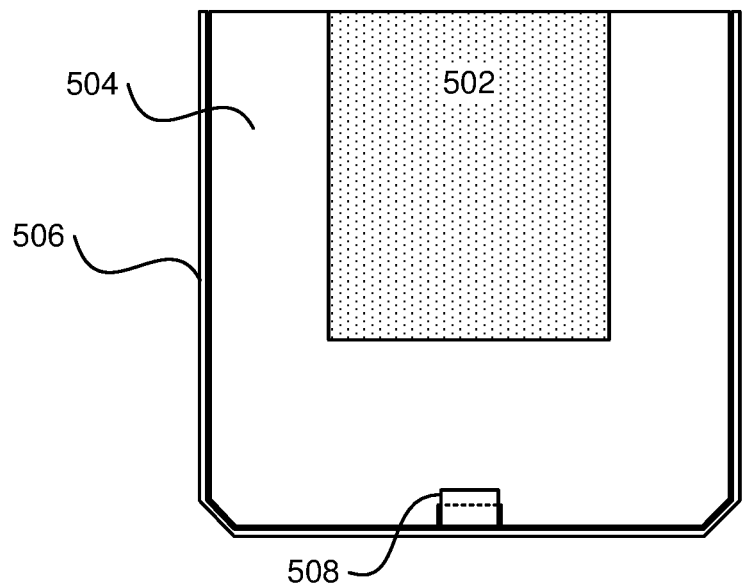
FIG. 7 is a cross section of a ferrite bar and elements of the WPT pad heat management system of FIG. 4.

FIG. 6 is a side view of a heat spreader 504 of the WPT pad heat management system of FIG. 4. FIG. 7 is a cross section of a ferrite bar segment 502 and elements of the WPT pad heat management system of FIG. 4, including a heat spreader 504, trough 506 and heat spreader anchor 508. In some embodiments, a top surface of the component of the ferrite structure is adjacent to a portion of the coil 402 and each of the plurality of heat spreaders 504 is shaped to contact at least a bottom of the component distal to the top surface. In some embodiments, each of the plurality of heat spreaders 504 has a planar shape and is positioned to extend away from the component into the PCM. In other embodiments, each of the plurality of heat spreaders 504 is further shaped to contact two sides of the component of the ferrite structure, as depicted in FIG. 5.

Figure 8:
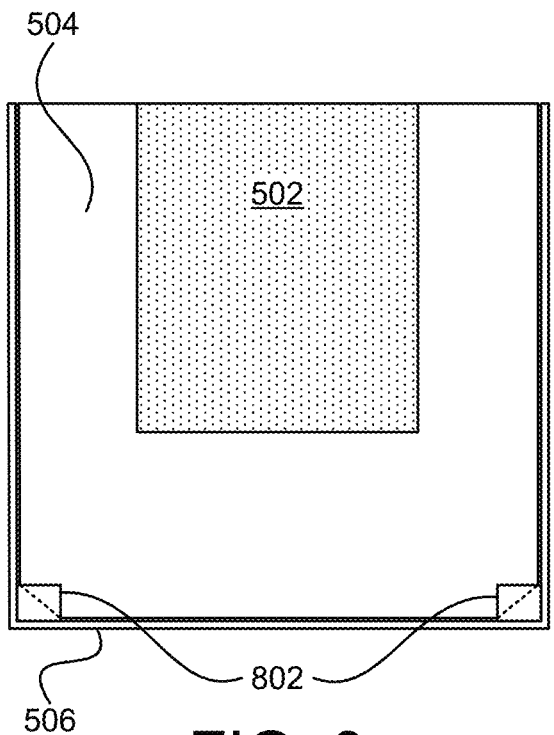
FIG. 8 is a cross section of an alternate embodiment of a WPT pad heat management system.

The notch in the center of the heat spreader 504 is sized for a ferrite bar 404 so that the heat spreader 504 contacts the sides and bottom of the ferrite bar 404. The notch at the bottom of the heat spreader 504 is to accommodate the heat spreader anchor 508. The bottom left and right corners are angled, in some embodiments, to accommodate a curvature or shape of corners of the trough 506 or for a heat spreader anchor 508, as depicted in FIG. 8. A shape of the heat spreader 504, in other embodiments, differs from the embodiment of FIG. 6 to accommodate a different shaped component of the ferrite structure or to accommodate a trough 506 with a different shape.

The heat spreaders 504 are made of a material chosen to conduct heat from the component (e.g. ferrite bar 404) of the ferrite structure in contact with the heat spreaders 504 to a phase change material ("PCM") in contact with the heat spreader 504. For example, the PCM may surround the heat spreaders 504 and portions of the component of the ferrite structure, such as areas within the trough 506. In some embodiments, once the heat spreaders 504 are placed on the heat spreader anchor 508 and the component (e.g. ferrite bar 404) of the ferrite structure is placed in the top notch of the heat spreaders 504 to contact the heat spreaders 504, the PCM in a liquid state is poured into the trough 506 and allowed to change to a solid state. In other embodiments, solid PCM is placed around the heat spreaders 504 initially. In this embodiment, once the primary pad 102 is in use at least a portion of the PCM melts and flows around the heat spreaders 504 and component of the ferrite structure.

In addition, the material of the heat spreaders 504 are typically non-metallic to avoid eddy currents and core loss. Possible candidate materials for the heat spreaders 504 are included in Table I. Not all of which are ideal candidates.

TABLE I

Possible Materials for Heat Spreaders

| Material | Density (g/cm³) | In-plane Thermal Conductivity (W/mK) | Through-plane Thermal Conductivity (W/mK) | Notes | Source |
|---|---|---|---|---|---|
| E-ins Ice9 | 1.5 | 4 | 1.5 | | TCPoly.com |
| PLA | 1.24 | 0.13 | 0.13 | Low k | www.sd3d.com |
| ABS-Plastic | 1.024 | 0.25 | 0.25 | Low k | Generally available |
| Alumina, Pure | 2 | 37 | 37 | Not flexible | Generally available |
| Carbon | Varies | 6.92 | | Polymorph dependent, not easily machined | Generally available |
| High Fill Epoxy | Varies | 2.163 | | Metallic fillers | Generally available |

The chosen PCM, in some embodiments, includes a phase change temperature between a solid state and a liquid state (melting temperature) of the PCM that is within an optimal temperature range of the ferrite structure. The optimal temperature range includes a temperature range where core loss of the ferrite structure is minimized as described above with regard to FIG. 2. A PCM helps to maintain a temperature of the ferrite structure within a range by maintaining a particular temperature at a phase change boundary between the solid and the liquid state.

During normal operation, when the primary pad 102 has current flowing through the coil 402, some core loss is present in the ferrite structure due to eddy currents. Initially, the ferrite structure will be at an ambient temperature and the PCM will be solid. As current begins to flow in the coil 402, temperature of the ferrite structure starts to rise. Temperature typically does not increase in all areas of the ferrite structure evenly, as depicted in FIG. 3. In FIG. 3, without a PCM or heat management system the temperature of the ferrite bars 304 near the center is higher than around a perimeter of the ferrite bars 304.

Once heat of a component of the ferrite structure rises to a the boundary between the solid and liquid phase of the PCM, assuming there is heat transfer from the component of the ferrite structure to the PCM, the process of the PCM changing from a solid to a liquid at that location begins. The PCM in that location will remain at the melting temperature until the PCM turns to liquid. The melting temperature is dependent on atmospheric pressure at the location of the PCM. Ideally, the PCM is chosen to absorb a lot of heat before changing completely to a liquid. Table II in FIG. 11 lists possible candidates for the PCM. The PCM candidates in Table II are only a small sample of possible PCM materials and merely illustrate a few candidates and characteristics of the PCM candidates.

The heat spreaders 504 act to transmit heat of the components of the ferrite structure to the PCM. Heat spreader 504 size and spacing, dimensions of the trough 506 and PCM type are design parameters that depend on expected conditions. Typically, the primary pad 102 is designed to wirelessly transfer a particular amount of power, such as 250 kW. The coil 402 is designed to handle current associated with the chosen amount of power to be transmitted. The ferrite structure is also designed to handle the chosen amount of power to be transmitted. Size of components of the ferrite structure are chosen along with a pattern for the ferrite structure. Sizes of the components of the ferrite structure are chosen to minimize core loss, to avoid saturation of the ferrite structure, etc.

Typically, the power level of the primary pad 102 is an indicator of an amount of heat to be dissipated in the solid material of the primary pad 102. In addition, efficiency of the coil and ferrite design affect core loss. The material chosen for the solid material includes heat transfer characteristics and affect heat dissipation. The heat spreaders 504 are designed to transfer the heat generated in the components of the ferrite structure, e.g. ferrite bars 404 based on a particular solid material. Some of the parameters to be considered when designing the heat spreaders 504 are shape, surface area, and material of the heat spreaders 504 along with spacing between heat spreaders 504.

The PCM is chosen based on melting temperature of the PCM. The melting temperature of the PCM is chosen to be at a core loss minimum or within an optimal temperature range of the components of the ferrite structure. The optimal temperature range is a temperature range where core loss of the ferrite structure is minimized, as described above. The temperature range, in some embodiments, is a range where a core loss of the ferrite structure is below a core loss threshold for a particular magnetic flux density. For example, for a particular magnetic field strength, core loss varies with temperature, as depicted in FIG. 2, and has a minimum value. A core loss threshold may be chosen to include a particular temperature range where core loss is minimized. In addition, other qualities of the PCM are considered during design, such as heat transfer rate, density, thermal conductivity, viscosity, flash point, specific heat, latent heat of fusion, etc.

The trough 506 is designed with a volume to hold the PCM and at least a portion of the heat spreaders 504. While the design depicted in FIGS. 4-7 are for the PCM surrounding the heat spreaders 504 and ferrite bars 404, other designs are possible. In addition, other designs are possible for the heat spreader anchors 508.

FIG. 8 is a cross section of an alternate embodiment of a WPT pad heat management system. In the embodiment, two heat spreader anchors 802 are included at bottom corners of the trough 506. In the embodiment, the heat spreaders 504 may be notched to accommodate the heat spreader anchors 508 to allow the heat spreaders 504 to extend to the sides and bottom of the trough 506. Other embodiments may include a design for the heat spreaders 504 and heat spreader anchors (e.g. 508, 802, etc.) where the heat spreaders 504 do not extend to the bottom and/or sides of the trough 506.

Figure 10A:
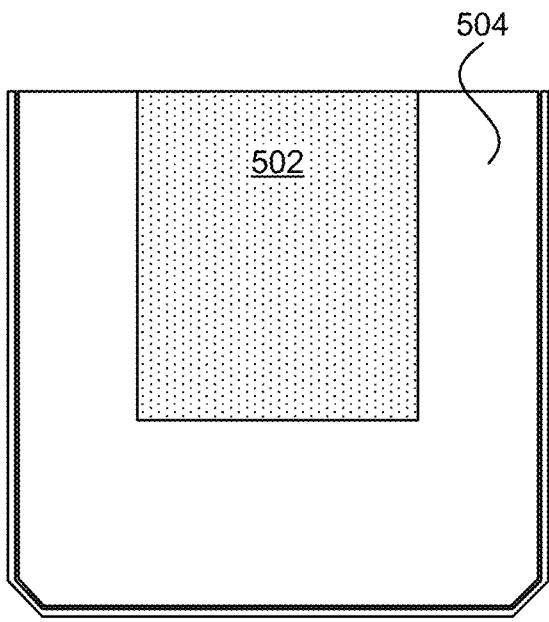
FIG. 10A is a cross section of yet another alternate embodiment of a WPT pad heat management system.
Figure 10B:
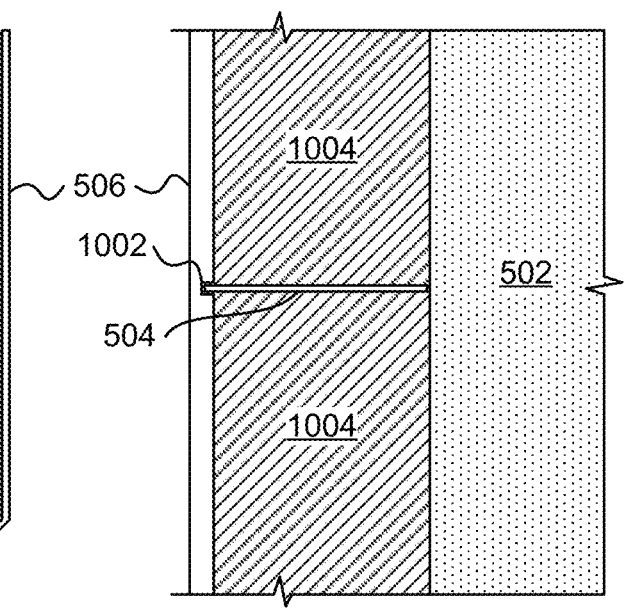
FIG. 10B is a top view of the WPT pad heat management system of FIG. 10A.

FIG. 10A is a cross section of yet another alternate embodiment of a WPT pad heat management system and FIG. 10B is a top view of the WPT pad heat management system of FIG. 10A. In the embodiment, the heat spreader anchors are slots 1002 in the trough 506 where the heat spreaders 504 may each be inserted into a slot 1002 and extend through PCM 1004. The slots 1002 are appropriately spaced and the embodiment offers a design that does not require an additional piece that serves as the heat spreader anchor (e.g. 508, 802). One of skill in the art will recognize other ways to anchor heat spreaders 504 in a trough 506.

Figure 9:
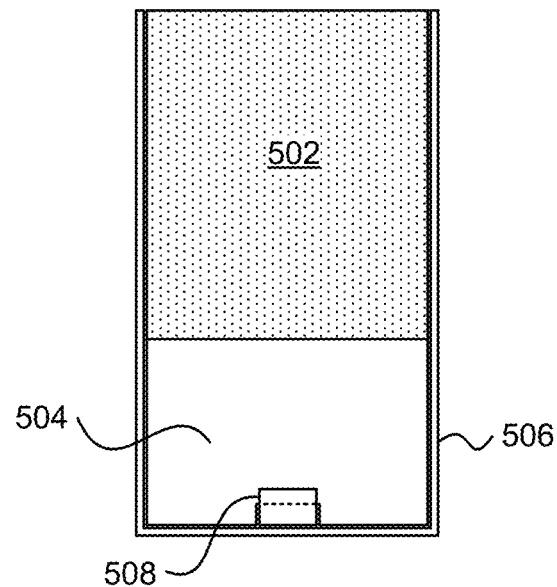
FIG. 9 is a cross section of another alternate embodiment of a WPT pad heat management system.

FIG. 9 is a cross section of another alternate embodiment of a WPT pad heat management system where the heat spreaders are on the bottom of ferrite bar segments 502. Another embodiment (not shown) may include heat spreaders 504 on the sides of the segments of ferrite bars 502. Other embodiments (not shown) may include heat spreaders 504 that are round, triangular or other shape. One of skill in the art will recognize designs of other heat spreaders 504 that transfer heat from a component of the ferrite structure to a PCM. In addition, one of skill in the art will recognize other possible designs for the trough 506 that surround the PCM and at least a portion of the PCM.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a ferrite structure positioned adjacent to a coil configured to wirelessly transfer power;
   a plurality of heat spreaders positioned along a length of a component of the ferrite structure, wherein each of the plurality of heat spreaders is non-metallic;
   a trough shaped to surround at least a portion of each of the plurality of heat spreaders, wherein the trough is non-metallic; and
   a phase change material ("PCM") in the trough, wherein at least a portion of the heat spreaders extend into the PCM,
   wherein the ferrite structure, coil, plurality of heat spreaders, trough and PCM are encased in a solid material, and
   wherein each of the plurality of heat spreaders comprises a material that transfers heat from the component of the ferrite structure to the PCM.

2. The apparatus of claim 1, wherein the PCM comprises a phase change temperature between a solid state and a liquid state of the PCM that is within an optimal temperature range of the ferrite structure, the optimal temperature range comprising a temperature range where core loss of the ferrite structure is minimized.

3. The apparatus of claim 2, wherein the temperature range comprises a core loss of the ferrite structure is below a core loss threshold for a particular magnetic flux density.

4. The apparatus of claim 1, wherein the component of the ferrite structure comprises a ferrite bar and the ferrite structure comprises a plurality of ferrite bars.

5. The apparatus of claim 1, wherein a top surface of the component of the ferrite structure is adjacent to a portion of the coil and each of the plurality of heat spreaders is shaped to contact at least a bottom of the component distal to the top surface.

6. The apparatus of claim 5, wherein each of the plurality of heat spreaders is further shaped to contact two sides of the component.

7. The apparatus of claim 5, wherein each of the plurality of heat spreaders comprises a planar shape and is positioned to extend away from the component into the PCM.

8. The apparatus of claim 1, wherein the plurality of heat spreaders are each positioned a uniform distance apart along a length of the trough.

9. The apparatus of claim 1, wherein the trough comprises a depth to surround the heat spreaders and component of the ferrite structure.

10. The apparatus of claim 1, further comprising a heat spreader anchor that contacts each of the plurality of heat spreaders and maintains a position of each of the plurality of heat spreaders with respect to each other, wherein the heat spreader anchor is non-metallic.

11. The apparatus of claim 10, wherein the heat spreader anchor comprises a linear element positioned at a bottom of the trough, the linear element comprising a slot for each of the plurality of heat spreaders, wherein each heat spreader of the plurality of heat spreaders engages a slot of the linear element such that the heat spreader is in a fixed position.

12. The apparatus of claim 10, wherein the heat spreader anchor comprises a plurality of grooves on an interior surface of the trough, wherein each groove is shaped to retain a heat spreader of the plurality of heat spreaders in a fixed position.

13. The apparatus of claim 1, wherein the solid material comprises concrete.

14. The apparatus of claim 1, wherein each of the plurality of heat spreaders comprises one of a thermally conductive, electrically insulating plastic, a ceramic, a polylactic acid, an acrylonitrile butadiene styrene ("ABS") plastic, alumina, carbon, and a high-fill epoxy.

15. An apparatus comprising:
   a ferrite structure positioned adjacent to a coil configured to wirelessly transfer power to a receiver, the ferrite structure comprising a plurality of components separated from each other wherein each component comprises a top surface positioned adjacent to the coil, each component comprising:
   a plurality of heat spreaders positioned along a length of the component, wherein each of the plurality of heat spreaders is non-metallic and extends away from a bottom of the component distal to the top surface and away from sides of the component;
   a trough shaped to surround each of the plurality of heat spreaders, wherein the trough is non-metallic; and a phase change material ("PCM") positioned in the trough, wherein each of the plurality of heat spreaders extend into the PCM, wherein the ferrite structure, coil, plurality of heat spreaders, trough and PCM are encased in concrete, and wherein each of the plurality of heat spreaders comprises a material that transfers heat from the component of the ferrite structure to the PCM, wherein the PCM comprises a phase change temperature between a solid state and a liquid state of the PCM that is within an optimal temperature range of the component of the ferrite structure, the optimal temperature range comprising a temperature range where core loss of the component of the ferrite structure is minimized.

16. The apparatus of claim 15, wherein each component of the ferrite structure comprises a ferrite bar and the ferrite structure comprises a plurality of ferrite bars spaced apart from each other.

17. The apparatus of claim 15, further comprising a heat spreader anchor for each component of the plurality of components, the heat spreader anchor of a component of the plurality of components contacts each of the plurality of heat spreaders of the component and maintains a position of each of the plurality of heat spreaders with respect to each other, wherein the heat spreader anchor is non-metallic.

18. The apparatus of claim 15, wherein the trough comprises a depth to surround the heat spreaders and component of the ferrite structure.

19. The apparatus of claim 15, wherein the plurality of heat spreaders of a component of the plurality of components of the ferrite structure are each positioned a uniform distance apart along a length of the trough.

20. A system comprising:
   a block of solid material;
   a coil configured to wirelessly transmit power to a receiver;
   a converter connected to the coil, the converter transmitting power to the coil;
   a ferrite structure positioned adjacent to the coil, the ferrite structure comprising a plurality of components, each component comprising:
      a plurality of heat spreaders positioned along a length of a component of the ferrite structure, wherein each of the plurality of heat spreaders is non-metallic;
      a trough shaped to surround at least a portion of each of the plurality of heat spreaders, wherein the trough is non-metallic; and
      a phase change material ("PCM") in the trough, wherein at least a portion of the heat spreaders extend into the PCM,
   wherein each of the plurality of heat spreaders comprises a material that transfers heat from the component to the PCM, and
wherein the ferrite structure, coil, plurality of heat spreaders, trough and PCM are encased in the block of solid material.

* * * * *